United States Patent
Sumic et al.

(10) Patent No.: US 6,259,972 B1
(45) Date of Patent: Jul. 10, 2001

(54) METHOD FOR PROCESSING AND DISSEMINATING UTILITY OUTAGE INFORMATION

(75) Inventors: Zarko Sumic, Bellevue; Lance J. Nelson, Clyde Hill; David Drake Callahan, Issaquah, all of WA (US)

(73) Assignee: Enghouse Systems USA, Inc., Seattle, WA (US)

( * ) Notice: Subject to any disclaimer, the term of this patent is extended or adjusted under 35 U.S.C. 154(b) by 0 days.

(21) Appl. No.: 09/008,133

(22) Filed: Jan. 16, 1998

(51) Int. Cl.$^7$ .................................................. G06F 17/00
(52) U.S. Cl. ........................................... 700/286; 700/292
(58) Field of Search .................................... 700/286, 287, 700/288, 289, 290, 291, 292, 293, 294, 295, 296, 297, 298; 395/500.26; 345/435; 703/5

(56) References Cited

U.S. PATENT DOCUMENTS

| | | | |
|---|---|---|---|
| 5,487,139 | * 1/1996 | Saylor et al. | 345/435 |
| 5,568,399 | 10/1996 | Sumic | 364/492 |
| 5,815,417 | * 9/1998 | Orr et al. | 395/500.26 |

OTHER PUBLICATIONS

J. Dangermond, "A Few New GIS and Enterprise Technologies," Environmental Systems Research Institute, Redlands, California, pp. 123–127, 5/97.

A.M. DiMarco, "Comparative Methods for Advocating Information Technology Investments," Intergraph Corporation, pp. 315–320, 5/97.

Z. Sumic, "Internet–Enabled Outage Management System," 11/97.

Z. Sumic, "Outage Determination: A New Approach," 1/97.

Z. Sumic et al., "A Method for Disseminating Outage Restoration Information Over Private and Public Data Networks," Dec. 1, 1997.

Z. Sumic et al., "Outage Management System—an Integrated Solution," 5/94.

Z. Sumic et al., "Fuzzy Set Theory Based Outage Determination", 1/96.

* cited by examiner

Primary Examiner—William Grant
Assistant Examiner—Steven R. Garland
(74) Attorney, Agent, or Firm—Christensen O'Connor Johnson Kindness PLLC

(57) ABSTRACT

A method and system for processing and disseminating utility outage information is disclosed. In response to the receipt of new data in the form of events, the data is mapped into a geographic information system and transmitted to selected recipients, or subscribers. Each subscriber has one or more areas of interest that define the information it receives. Each subscriber also has a security classification that further defines the information it may receive as well as the subscriber's ability to trigger events, or update the outage information. The mechanism of the invention employs multiple ways of disseminating the information. A subscriber may request that updated information be sent to the subscriber in response to a subscriber's request. Alternatively, the subscriber may request that updated information be automatically transmitted to the subscriber when updated information is received.

24 Claims, 13 Drawing Sheets

| SWITCH | ON LINE | AT BUS | STATUS |
|---|---|---|---|
| S1 | L1 | C2 | CLOSED |
| S2 | L2 | B1 | CLOSED |
| S3 | L4 | B2 | CLOSED |
| S4 | L5 | B3 | CLOSED |
| S5 | L6 | B4 | CLOSED |
| S6 | L7 | B8 | OPEN |
| S7 | L10 | B7 | CLOSED |
| S8 | L12 | B5 | CLOSED |
| S9 | L8 | B6 | CLOSED |
| S10 | L11 | C3 | CLOSED |

*Fig.3A.*

| LINE | FROM BUS | TO BUS | CIRCUIT | SUBSTATION |
|---|---|---|---|---|
| L1 | C2 | B1 | C2 | SUB1 |
| L2 | B1 | B2 | C2 | SUB1 |
| L3 | B2 | B3 | C2 | SUB1 |
| L4 | B2 | B4 | C2 | SUB1 |
| L5 | B3 | D1 | C2 | SUB1 |
| L6 | B4 | B8 | C2 | SUB1 |
| L7 | B5 | B8 | C3 | SUB2 |
| L8 | B6 | B5 | C3 | SUB2 |
| L9 | B7 | B6 | C3 | SUB2 |
| L10 | B7 | D2 | C3 | SUB2 |
| L11 | C3 | B7 | C3 | SUB2 |
| L12 | B5 | D3 | C3 | SUB2 |

*Fig.3B.*

METHOD FOR PROCESSING AND DISSEMINATING UTILITY OUTAGE INFORMATION

FIELD OF THE INVENTION

The present invention relates to the field of power outage management systems and, in particular, to methods and systems for processing and disseminating utility outage information.

BACKGROUND OF THE INVENTION

A power distribution utility strives to provide customers with a reliable power supply and high quality service while maintaining maximum cost efficiency. Disruptions occurring in the power supply due to faults caused by natural hazards or system malfunctions affect the reliability of the system and, consequentially, customer satisfaction.

Distribution systems utilized by electric power utilities generally use a power distribution grid that includes a power source, such as a substation, connected to terminal nodes by power distribution lines. Protective devices, such as fuses or circuit breakers, are strategically placed and designed to operate when a fault in the power distribution grid occurs, in order to minimize the portion of the system that is affected by the resulting power outage. During major storms, utilities track and prioritize power outages, dispatch and coordinate the labor force, and direct system restoration. Information from several different utility information systems is combined and analyzed in order to identify a power outage, determine the location of the fault that caused it, and estimate the number of affected customers. Utilities use automated mapping/facilities management (AM/FM) systems based on geographic information systems (GIS). Integration of GIS-based AM/FM systems with customer information systems (CIS), as well as supervisory control and data acquisition (SCADA) systems, provides an effective environment for an outage management system (OMS).

An OMS is a decision support environment that is used to address complex problems faced by distribution dispatchers and system operators in an emergency situation. In an integrated environment obtained by combining information from GIS-based AM/FM systems, CIS, and SCADA systems, the OMS allows concurrent processing of data from multiple sources. The sources of data include information from customer calls that are received and logged in trouble order tracking (TOT) systems. Automated monitoring sources include power outage monitors or automated meter reading systems that automatically contact a control station after loss of power is identified. An OMS combines the power outage data with data describing distribution network topology and protective device schema derived from GIS coverage maps to determine a probable fault location. Additionally, an OMS processes power outages reported by SCADA alarms or field crew reports called in by radio.

When a power outage is identified, available information is processed to determine the number of customers without power and to determine priorities, in order to help dispatchers optimally dispatch crews. The OMS maintains current information on power outages and provides users with suggestions on the probable causes of the power outages. A geographically referenced full graphic environment acts as an electronic "pin map" to display locations of trouble calls and to determine the causes of power outages. The graphic environment also allows a user to select, query, and update information associated with power outages and trouble calls.

In response to power outage data, the OMS determines the sources and extent gas of faults within the system. A graphic display can illustrate the location of trouble calls, system faults, and the extent of power outages. U.S. Pat. No. 5,568,399, entitled "Method and Apparatus for Power Outage Determination Using Distribution System Information," by Sumic, describes a method for determining the probable location of a fault causing a power outage in a power distribution system. During power outage situations, it is necessary to disseminate information to numerous parties. Customer call representatives, customer service engineers, dispatchers, system engineers, schedulers, work crews, media services, corporate executives, and end users need or desire access to portions of the information. Each party has particular needs or desires with respect to the amount of information it receives. Additionally, a power utility may desire restrictions on the information that each party is permitted to receive.

It is therefore desirable to have an automated system for disseminating power outage information to various parties. Preferably, such a system will store or determine data specifying the information desired by each party, as well as the restriction requirements pertaining to each party. Preferably, such a system will automatically provide information to each party and will update the information promptly. A preferable system will provide interested parties with a choice of whether updated information is to be automatically displayed on their respective computer monitors, or is to be stored until the party requests updated information. The present invention is directed to providing such a mechanism.

SUMMARY OF THE INVENTION

In accordance with this invention, a system and method for processing and disseminating utility outage information is disclosed. New information is received in the form of events and mapped into a geographic information system and a database of information corresponding to power utility distribution. The combined data is used to generate graphic data, which is transmitted to subscribers. Three groups of subscribers are provided for, corresponding to different levels of data access and input. Each subscriber has one or more areas of interest that define the information it receives.

In accordance with other aspects of the invention, data may be pushed to selected subscribers in response to receiving events representing outage information. Data may also be stored and pulled by a subscriber in response to a command from the subscriber computer.

In accordance with still other aspects of the invention, selected data may be transmitted to subscribers in a departmental group including subscribers with high access rights. Preferably, the departmental group is the only group that has the ability to enter new outage information into the system. Selected data may also be transmitted to subscribers in a company group including subscribers with medium access rights. Preferably, the company group has rights to access a broad amount of information, but cannot enter new outage information. Selected data may be transmitted to subscribers in an external group including subscribers that have restricted access to information and cannot enter new outage information.

In accordance with yet still other aspects of the invention, data is transmitted to subscribers in the departmental group using a corporate local or wide area network. Data is transmitted to subscribers in the company group using a local area network, and data is transmitted to external subscribers using a wide area network, such as the Internet.

As will be readily appreciated from the foregoing description, a system and method for processing and disseminating utility outage information formed in accordance with the invention provides a way of selectively distributing outage information to interested recipients. Only designated recipients are provided with the ability to update the information. The invention maintains data corresponding to the recipients, so that the amount and type of information is limited for recipients, thereby reducing a problem of excess information. The invention further provides both push and pull delivery mechanisms in order to address each recipient's needs. By improving the delivery mechanisms, the system assists in keeping interested parties informed of current outage information.

BRIEF DESCRIPTION OF THE DRAWINGS

FIGS. 3A to 3E illustrate the data represented by the power distribution system of FIG. 1;

The foregoing aspects and many of the attendant advantages of this invention will become more readily appreciated as the same becomes better understood by reference to the following detailed description, when taken in conjunction with the accompanying drawings, wherein:

DETAILED DESCRIPTION OF THE PREFERRED EMBODIMENT

The present invention provides a mechanism for automatically disseminating power outage information to interested parties, such as maintenance personnel, dispatchers, utility executives, media, and commercial or residential utility customers. The mechanism of the invention receives new data in the form of events, maps the data into a geographic information system (GIS), and transmits the updated information to selected recipients. Each recipient has one or more areas of interest that define the set of information it receives. Each recipient also has a security classification that further defines the information it may receive as well as its ability to trigger events, or update the outage information.

Figure 1:
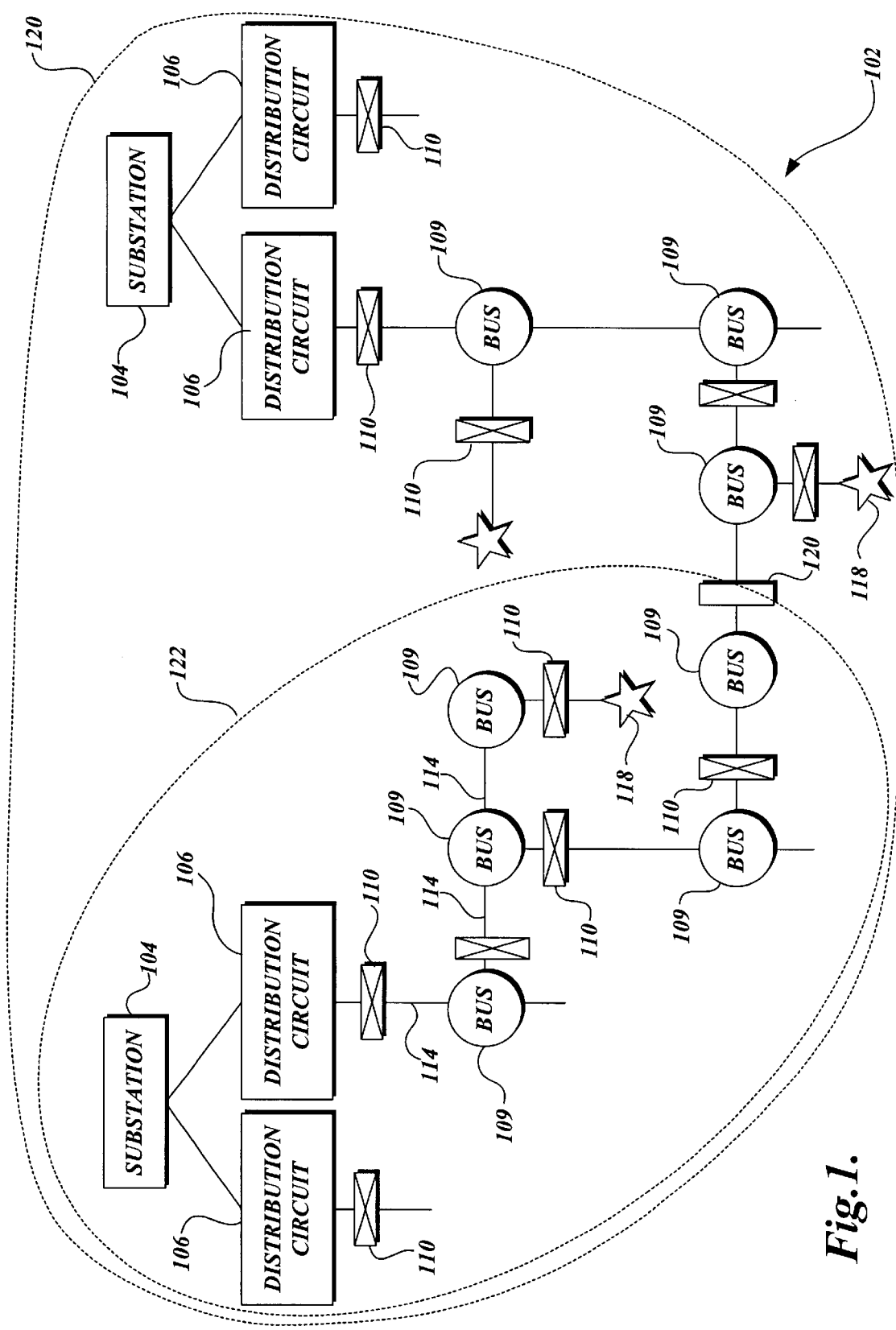
FIG. 1 is a block diagram of a power distribution system to which the present invention is applied.

FIG. 1 illustrates a power distribution system grid 102 of a type in which the present invention is useable. The power distribution grid 102 includes substations 104 that function as a power source. Each substation 104 is connected to one or more distribution circuits 106 that serve respective areas "downstream" from the substation. A power distribution circuit 106 comprises one or more power lines 114 that are interconnected to provide power to a delivery point 118. A delivery point 118 is the point where customers are logically connected to the system.

Each power line 114 has two buses 109 at respective ends of the power line. A bus is an end point, or a termination point, of a power line. For example, a bus can be a utility pole or a delivery point. A bus can also have a switch 110 or a transformer (not shown) appended to it. The power distribution grid 102 also includes a plurality of protective devices, such as fuses, fuse disconnects, reclosers, or other types of circuit breakers. The grid further includes a plurality of switches, which are illustrated in FIG. 1 as closed switches 110 and an open switch 120. The substations 104, which are served by a power transmission system (not shown), supplies power to the power lines 114, which in turn supply power to customers connected to respective delivery points 118. When a power outage occurs due to a fault, the protective device closest upstream to the fault operates to limit the effect on the fault. The design of the system of protective device seeks to ensure that only a minimal portion of the entire grid is effected during a power outage.

The power distribution grid 102 is divided into multiple regions, which may overlap or be nested. A region represents geographically grouped areas including at least one substation 104. FIG. 1 depicts two regions: the larger region 120 includes both substations 104 and all downstream components. The inner region 122 comprises a single substation 104 and all downstream components.

Figure 2:
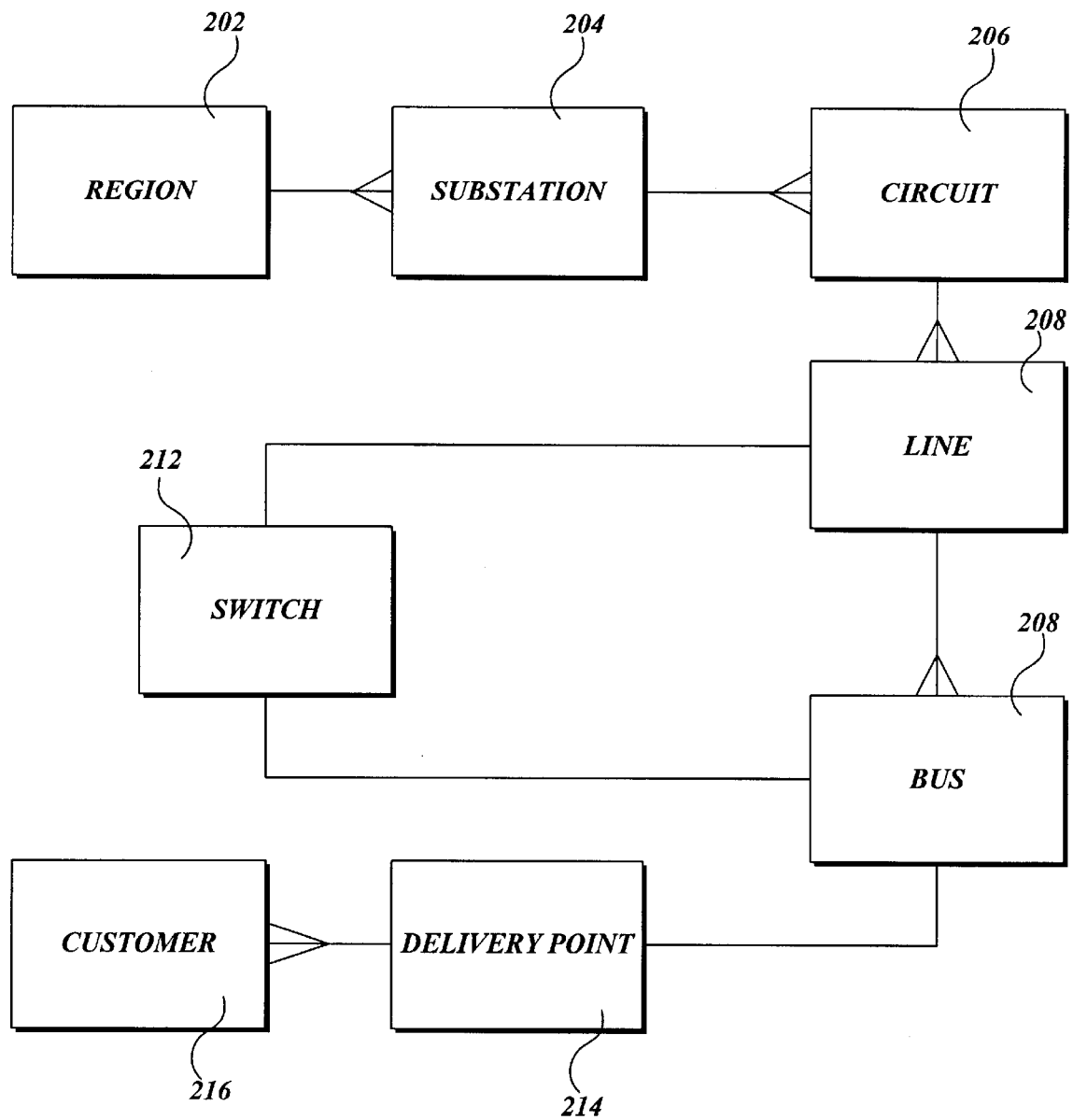
FIG. 2 illustrates the key components of a power distribution system, and the relationships between components.

FIG. 2 illustrates the relationship among the power distribution grid components. As depicted in FIG. 2, a region 202 includes one or more substations 204. Each substation 204 includes one or more circuits 206. Each circuit includes one or more power lines 208, each power line having two buses 210. A power line 208 may optionally have an associated switch 212 or transformer (not shown) appended to one or both buses. Each bus 210 has one corresponding delivery point 214, which may have one or more customers 216.

Figure 3C:
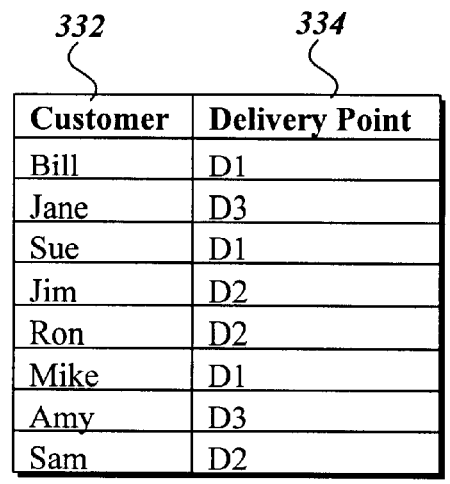

FIGS. 3A–E illustrate, in tabular format, the information pertaining to the power distribution grid 102 depicted in FIG. 1. FIG. 3A illustrates the data corresponding to each switch. A switch column 304 lists the switch identifier corresponding to each switch in the power distribution grid 102. A line column 306 shows the line identifier corresponding to each switch. A bus column 308 specifies the bus identifier corresponding to each switch. A status column 310 specifies, for each switch, whether the switch is open or closed.

FIG. 3B illustrates a power line information table 312, and shows the data corresponding to each power line. A line column 314 lists a line identifier corresponding to each power line depicted in FIG. 1. A "from bus" column 316 and a "to bus" column 318 specify bus identifiers representing buses attached to each power line. A circuit column 320 specifies a circuit within which the corresponding power line resides. A substation column 322 specifies the substation "upstream" from the corresponding power line.

FIG. 3c illustrates a customer information table 330 providing data pertaining to individual customers. A customer column 332 lists each individual customer, and a delivery point column 334 specifies the delivery point corresponding to the customer.

Figure 3D:
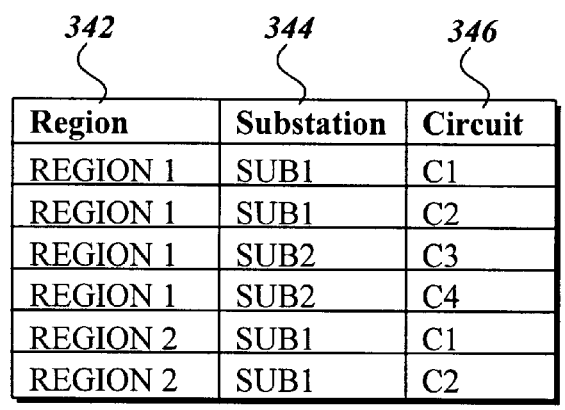

FIG. 3d illustrates a "region information" table 340 containing data pertaining to each region of the power distribution grid 102 depicted in FIG. 1. A region column 342 lists each region in the power distribution grid. A substation column 344 and a circuit column 346 specify a substation and a circuit, respectively, corresponding to each region listed in the region column 342. Because a substation can have more than one circuit, and a region can contain more than one substation, the region column 342 contains multiple entries for each region.

Figure 3E:
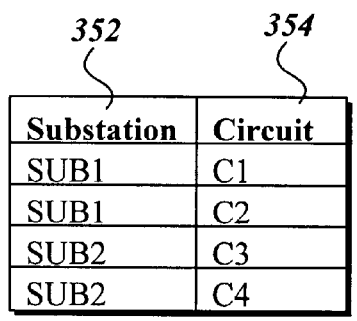

FIG. 3e illustrates a "substation information" table 350 containing data pertaining to each substation of the power distribution grid 102 depicted in FIG. 1. A substation column 352 contains a list of substations. A circuit column 354 specifies a circuit corresponding to each substation. Because a substation can have more than one circuit, the substation column 352 can include multiple entries for each substation.

Figure 4:
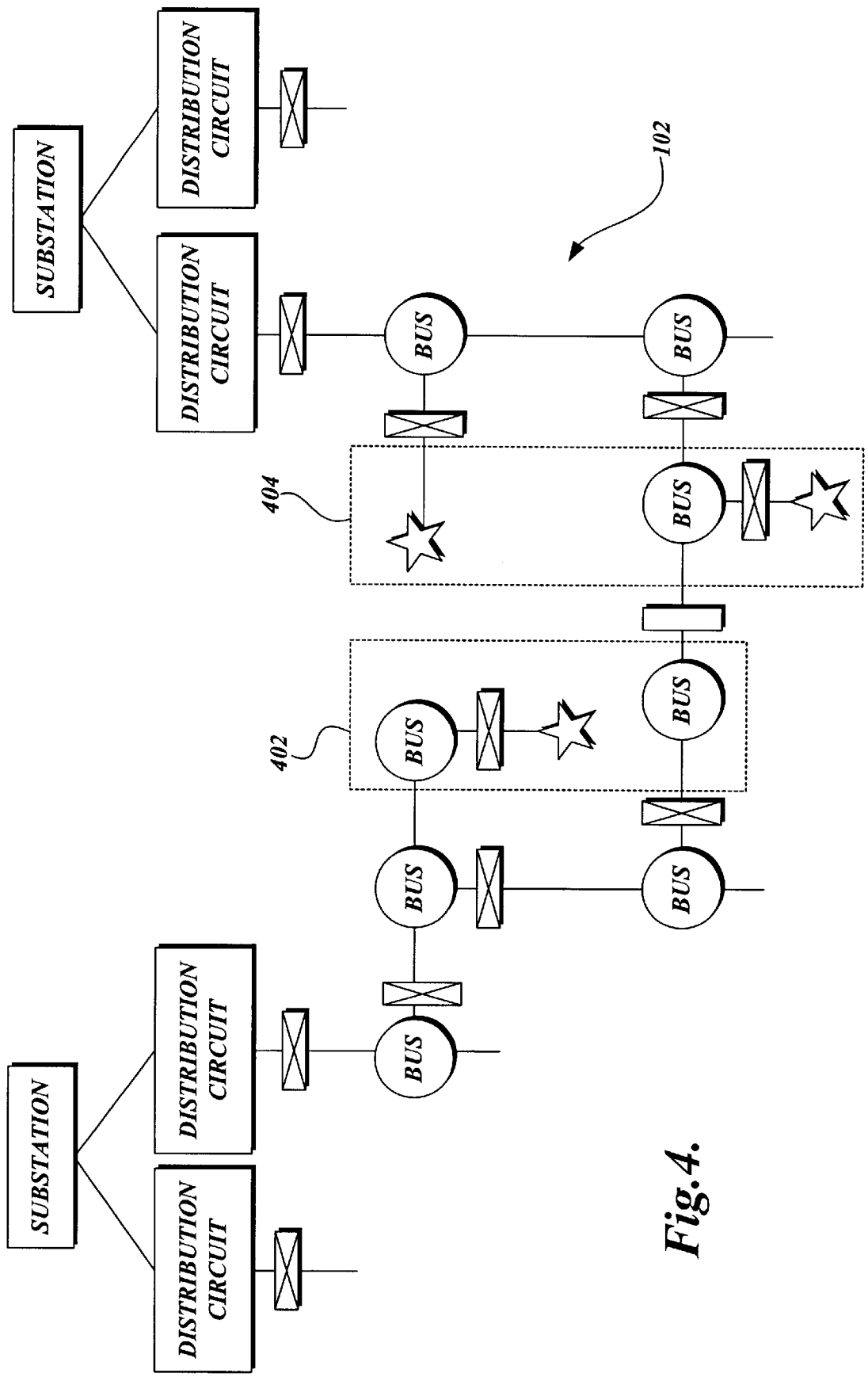
FIG. 4 illustrates the power distribution system of FIG. 1 with exemplary areas of interest delineated.

FIG. 4 illustrates the power distribution grid 102 depicted in FIG. 1. In the illustration of FIG. 4, a first area of interest 402 and a second area of interest 404 are depicted by dashed lines. An area of interest represents a geographical area containing power distribution grid components that are of particular interest to a utility customer or other party. For example, the distribution point 118 serves the customers Bill, Sue, and Mike, according to the customer information table 330 depicted in FIG. 3c. Therefore, these customers may have a corresponding area of interest 402 that includes the distribution point 118 and power distribution grid components, such as buses, switches, or power lines, proximate to the distribution point 118.

Similarly, the distribution point 119 serves the customers Jim, Ron, and Sam, and the distribution point 121 serves the customers Jane and Amy, according to the customer information table 330 depicted in FIG. 3c. Therefore, an area of interest 404 corresponds to all of these customers.

Figure 5:
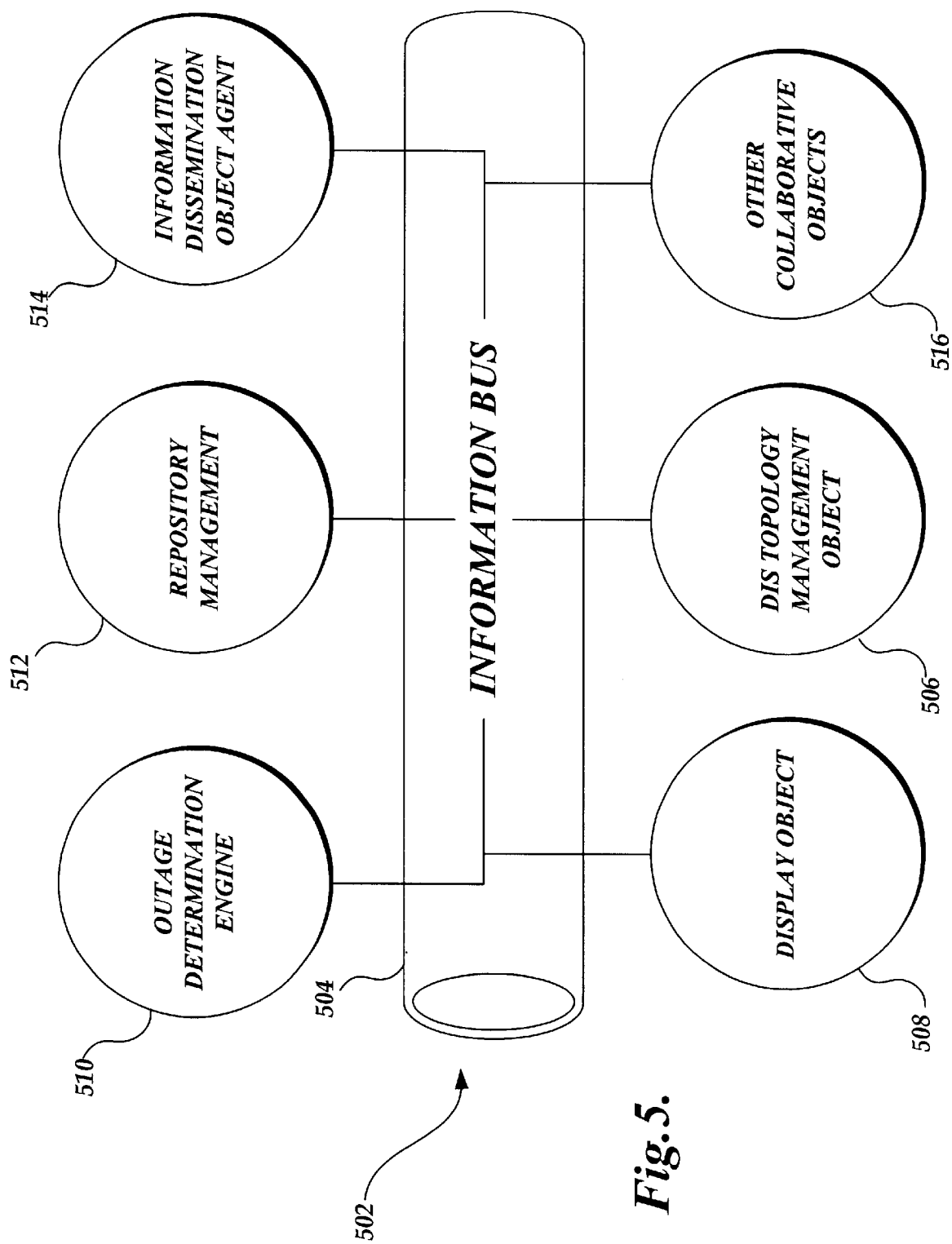
FIG. 5 illustrates an outage management system (OMS) that addresses power outages.

FIG. 5 illustrates an outage management system (OMS) that addresses power outages. The outage management system 502 comprises a number of components that communicate with each other via an information bus 504. The information bus 504 represents a logical communication mechanism between the components, and can comprise any one or more of a number of well known communication mechanisms, such as message passing and event triggering. As illustrated in FIG. 5, a distribution information system (DIS) 506 contains information about the structure of a power distribution network. This includes system topology data, current status of the switchable devices, and information on how and where customers are connected to the network. In addition to maintaining the necessary information that is useful for accounting of installed facilities, the DIS uses a topology of connected devices via power lines in conjunction with switch status data to determine power connectivity at any point in time. This includes information of the power source, distribution starting points, power line representation, flow control via switch status, and customer delivery points. The distribution information system maintains information on current conditions and allows for near real time access to data representing actual events pertaining to the physical plant.

In order to support spatial processing and geographically referenced displays, the DIS 506 communicates with a display object 508. The display object 508 may comprise a geographic information system (GIS) or a computer-aided design (CAD) system. The OMS also includes a request broker (not shown), which is preferably event driven. The request broker synthesizes and processes events reported from different sources. These sources include customer reported power outage calls, abnormal switching operation data from supervisory control and data acquisition (SCADA) systems, deenergized meter information, and crew status and location data.

The outage management system also includes an outage determination engine 510 that identifies the location of a fault based on all available information. A power outage determination system is disclosed in U.S. Pat. No. 5,568,399, "Method and Apparatus for Power Outage Determination Using Distribution System Information," by Sumic, which is herein incorporated by reference. The outage management system 502 further includes an outage processing module(not shown) that identifies deenergized areas, determines customers that are affected, determines power load that is lost, and determines whether any life supporting devices exist in deenergized areas. A repository management component stores and manages outage data. An information dissemination agent 514 also responds to events, and disseminates updated information to the various interested parties. The mechanism of the invention primarily resides within the information dissemination agent 514.

The following list provides examples of power outage related events that may be processed by the mechanism of the present invention.

Deenergized area (power outage determined).

Customer premise without power reported (trouble call).

Deenergized premise reported by automated meter reading (AMR).

This includes automated meters that communicate with a base station using radio frequencies or cellular technologies.

Deenergized premise reported by intelligent electronic device (IED).

IEDs can be positioned at strategic points within the power distribution grid.

Work crew relocation reported.

Supervisory control and data acquisition (SCADA) device operation reported.

Work crew status change reported.

Manual switch operation.

Safety tagging reported. "Safety tags" are warning tags that workers place to notify others that work is being performed. For example, when a worker turns off a switch prior to beginning work on a circuit, a tag is placed near the switch to notify others, in order to avoid someone turning on the switch before the work is complete.

Grounding of the power line reported.

System users may subscribe to individual events and to one or more areas of interest in order to customize their access to information from the OMS. Additionally, users may specify that information is either "pushed" or "pulled" from the OMS. When push is specified, the OMS automatically sends information to recipients in response to the processing of events that the recipient subscribes to. When pull is specified, the OMS stores the data until a user requests an information update. A user may specify one or both delivery mechanisms. In particular, a user may specify that a push delivery system is to be used for one set of events or areas of interest and the pull mechanism is to be used for a second set of events and areas of interest.

In accordance with the invention, multiple categories of users are provided for. One actual embodiment of the invention includes three classes of users: "departmental" users, "company" users, and "external" users. Departmental users are the primary users of the OMS. These are generally people that actively participate in power outage restoration activities and therefore require detailed information about power distribution system conditions. Departmental users are notified of events as they occur, and have full access to information that is pertinent to their area of responsibilities. Departmental users also provide input to the system. For example, dispatchers and work crews are examples of departmental users. They must have knowledge of detailed information, and also provide status information to the system. Customer call representatives and customer service engineers are also examples of departmental users. Customer call representatives relay information from customers to the OMS.

The company category generally comprises personnel that receive read-only access to OMS information. Company users may request that they be automatically notified when events of interest occur, using the push mechanism. Alternatively, they may request that information be stored and "pulled" when updates are desired.

External users also have read-only access to the OMS information. Additionally, portions of the information may be restricted from access by external users. This class generally includes media, participants in the regulated energy market such as power marketers and Utility Distribution Channel (UDC) residential and commercial customers. Commercial and residential end users may also be included in the external category.

Departmental users and company users receive OMS information via a "corporate network." External users receive OMS information via an "external network." The terms "corporate network" and "external network" describe logical networks, and may be implemented by using a variety of communication technologies. The communication technologies, which include hardware, software, and communication protocols, may be different for the corporate network and external network, but the invention does not require that they differ. Some or all of the communication technology implementing the corporate network may be the same or similar to the communication technology implementing the external network.

Figure 6:
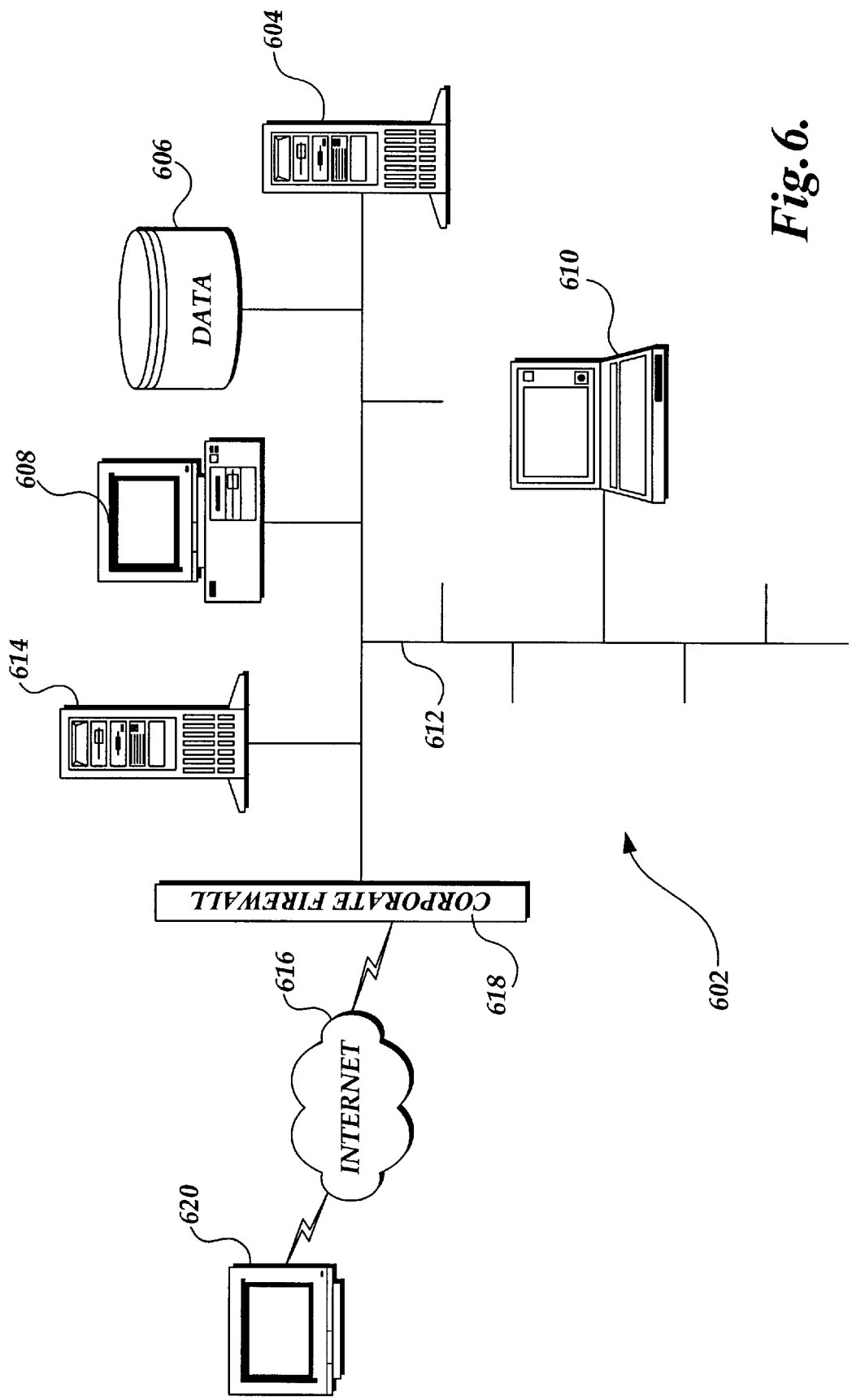
FIG. 6 illustrates a computer network system for implementing the present invention.

FIG. 6 illustrates an exemplary computer network 602 configuration for use in implementing the present invention. One or more OMS server computers 604 perform most of the OMS functions. An OMS server computer 604 is preferably a computer of a type that includes an amount of volatile memory and nonvolatile memory, such as a hard disk or other storage device. In addition, an OMS server computer 604 includes a processor, keyboard, a directional input device such as a mouse, and a display device, such as a cathode ray tube (CRT) or a liquid crystal display (LCD). As will be readily understood by one skilled in this art, and others, a number of different configurations are available for server computers. Preferably, the OMS software executes on the OMS server computer 604.

A data storage device 606 stores data pertaining to the outage management system. This includes GIS data, power distribution grid topology data, and other data as discussed above. The data storage device 606 may be configured as an integral component of the OMS server 604, as a peripheral device, or as part of a separate computer that communicates with the OMS server computer 604.

In one actual embodiment, the OMS server computer 604 communicates directly with one or more departmental class computers 608, with which a departmental class user interacts. The departmental class computer 608 may be a personal computer having a component architecture as described above for the OMS server computer 604. It may also be a network computer (NC), lacking a permanent storage device. The departmental class computer 608 communicates with the OMS server 604 via a corporate network, which may include a direct link, a local network, or a wide area network. The Internet is one example of a wide area network. The departmental class computer 608 and the OMS server computers 604 are preferably linked in a "client-server" architecture. Client-server architectures are well known in the art of computer systems, and are discussed herein only as necessary to describe the present invention.

Company class users interact with one or more company class computers 610, which communicate with the OMS server computer 604. The company class computer 610 may be a personal computer or a network computer, as discussed above for the departmental class computer 608. The company class computer 608 may communicate with the OMS server 604 by a direct link, a local area network, or a wide area network. In one actual embodiment, the company class computers 610 communicate with the OMS server computer 604 over a local area network 612. Local area networks are well known in the art of computer systems, and are discussed herein only as necessary to describe the present invention.

As depicted in FIG. 6, an Internet server computer 614 communicates with external class computers 620 via a wide area network, such as the Internet. The Internet server computer 614 may also function as a server for the corporate network that includes the company class computer 610. The corporate network may include a local area network. In this function, the Internet server computer 614 may also be an intranet server computer. In such an architecture, the company class computer 610 communicates over the local area network 612 with the Internet server computer 614, rather than communicate directly with the OMS server computer 604. The Internet server computer 614 therefore functions as an intermediary between the company class computer 610 and the OMS server computer 604. The Internet server computer 614 may communicate with the OMS server computer 604 over a local area network or by a direct link.

In a preferred architecture, a "firewall" 618 is logically situated between the Internet server computer 614 and the Internet 616. A firewall provides security to the Internet server computer 614 and all other computers "behind" the firewall. The firewall 618 may comprise one or more computers having security software residing thereon. It may also comprise security software executing on the Internet server computer 614. Firewalls are well known in the art of computer systems, and are discussed herein only as necessary to describe the invention.

The firewall 618 is an intermediary between the Internet server computer 614 and the Internet 616. External users interact with one or more external class computers 620, which connect to the Internet 616 through Internet service providers (not shown) or other network intermediaries. The external class computer 620 is preferably a personal computer or network computer having an architecture similar to the departmental class computer 608 discussed above.

In an alternative architecture, the company class computer communicates with the Internet server computer 614 over a wide area network, such as the Internet. Additionally, the departmental class computer 608 may also communicate with the Internet server computer 614 over the Internet. To implement this, executable program code may be transmitted to the departmental class computer over the wide area network. ActiveX technology and Java applets are examples of technologies that permit executable program code to be transmitted over the Internet and executed in conjunction with a browser program. As discussed above, the departmental class computer 608 and the company class computer 610 communicates with the OMS server computer 604 via a corporate network, and the external class computer communicates with the OMS server computer 604 via an external network.

Figure 7:
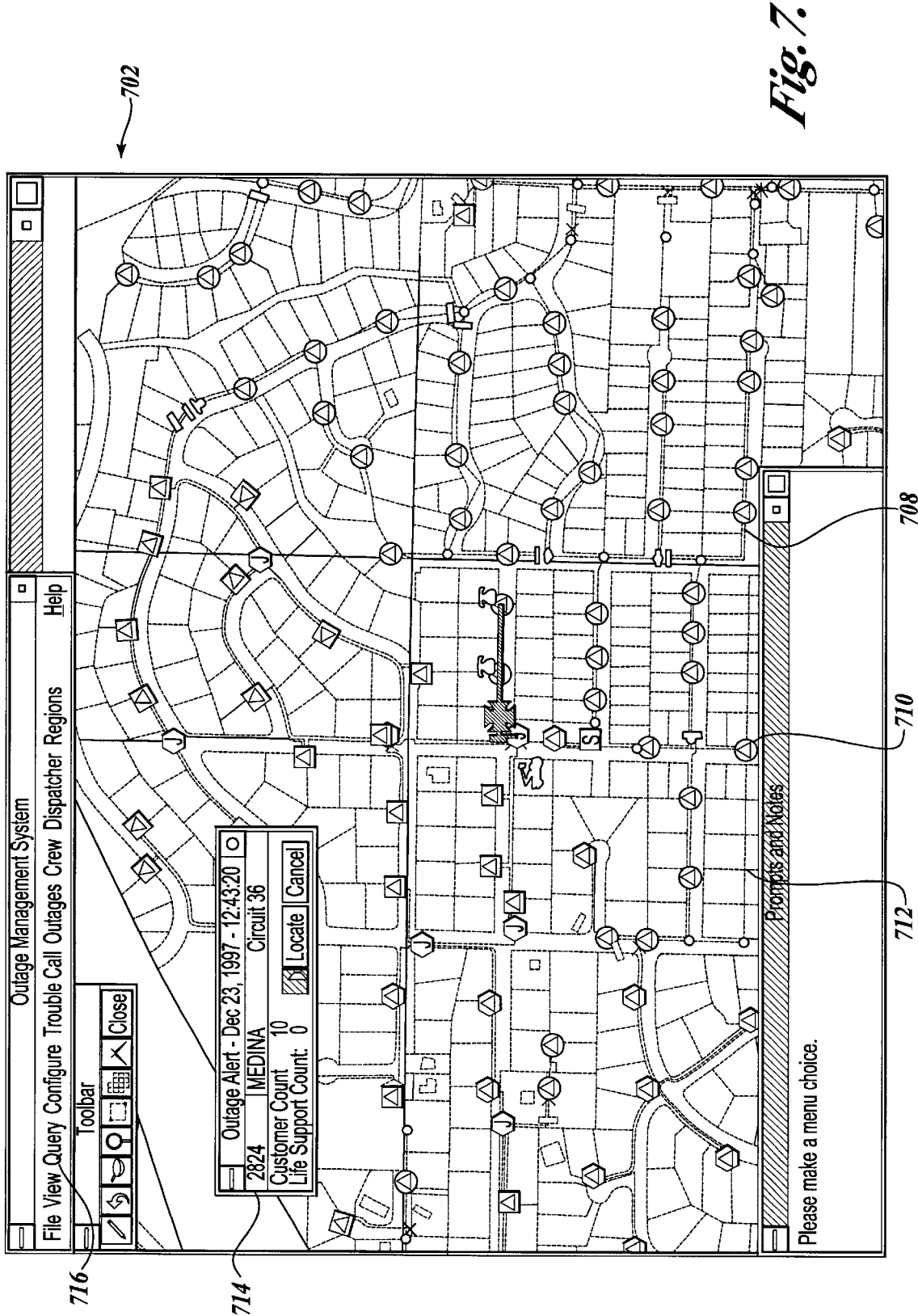
FIG. 7 to 9 illustrate graphic displays for presenting power outage information to interested parties.

FIG. 7 illustrates a graphic display 702 for presenting power outage information to a departmental user. The graphic display 702 presents geographic information and produces an electronic "pin map" with symbols representing relevant features. The graphic display allows a departmental user to select, query, and update information associated with outages and trouble calls.

Bus symbols 704 indicate the location of devices, such as switches or transformers. Line symbols 706 and 707 indicate the location of power lines. Trouble call symbols 708 adjacent to bus symbols 704 indicate that a call has been received notifying the utility of a lack of power at the point designated by the trouble call symbol.

In response to the receipt of one or more trouble calls, the OMS automatically determines a device that is most probably causing the outage. An outage symbol 710 indicates the determined device. Different colors are used to indicate whether the outage source is confirmed or unconfirmed. The power line symbols 707 downstream of the outage symbol 710 are highlighted in the same color as the outage symbol 710 to indicate the extent of the outage. A service truck symbol 712 indicates that a work crew has been dispatched to the location represented by the service truck symbol.

An "Outage Alert" window 714 displays information pertaining to a power outage. For example, as depicted in FIG. 7, the Outage Alert window 714 displays the number of customers and the number of life support systems affected by the power outage represented by the outage symbol 710.

In one actual embodiment of the invention, a "Query" menu 716 provides a departmental user with a set of commands that query the OMS for information. In the actual embodiment of the invention, the following queries are available via the Query menu 716.

Trace upstream/downstream. This command causes power line symbols upstream or downstream from a designated point to be highlighted.

Customers upstream/downstream. This command compiles a list of customers who are served from a designated line.

Customers at Transformer. This command compiles a list of customers who are served by a designated transformer.

Load. This command causes the display of information pertaining to transformers downstream from a selected section of a circuit.

Trouble call. This command causes the display of information on the calls to report a power outage. The information includes customer information, time of call, customer comments, and additional information pertaining to the customer.

Outage. This command causes the display of information pertaining to a designated outage.

Crew. This command causes the display of information on current work crew assignments, which are indicated by the service truck symbols 712 on the graphic display 702.

Points. This command allows a user to query information pertaining to a selected device.

Lines. This command allows a user to compile structural information pertaining to one or more power lines.

Locate. This command allows a user to designate a facility, circuit, GIS object, or an X, Y coordinate, and causes the system to highlight the designated item or point on the graphic display 702.

In one actual embodiment of the invention, a "Crew" menu 718 provides a departmental user with a set of commands that are used to update information pertaining to work crews. In the actual embodiment of the invention, the following commands are available via the Crew menu 718.

Assign. This menu command allows a user to assign a crew to work on a power outage.

Update. This menu command allows a user to update the status of a crew working on a particular outage, or to move the crew to a different outage. When a crew is moved, the corresponding service truck symbol is moved accordingly.

Unassign. This menu command allows a user to delete a crew from an outage site.

In a configuration wherein a departmental computer communicates via a wide area network such as the Internet, or a local area network, a departmental subscriber may interact with a browser program executing on the departmental computer. In such an architecture, executable program code may be transmitted to the departmental computer to provide the user with the ability to update information. For example, ActiveX components or Java applets may perform this function.

Figure 8:
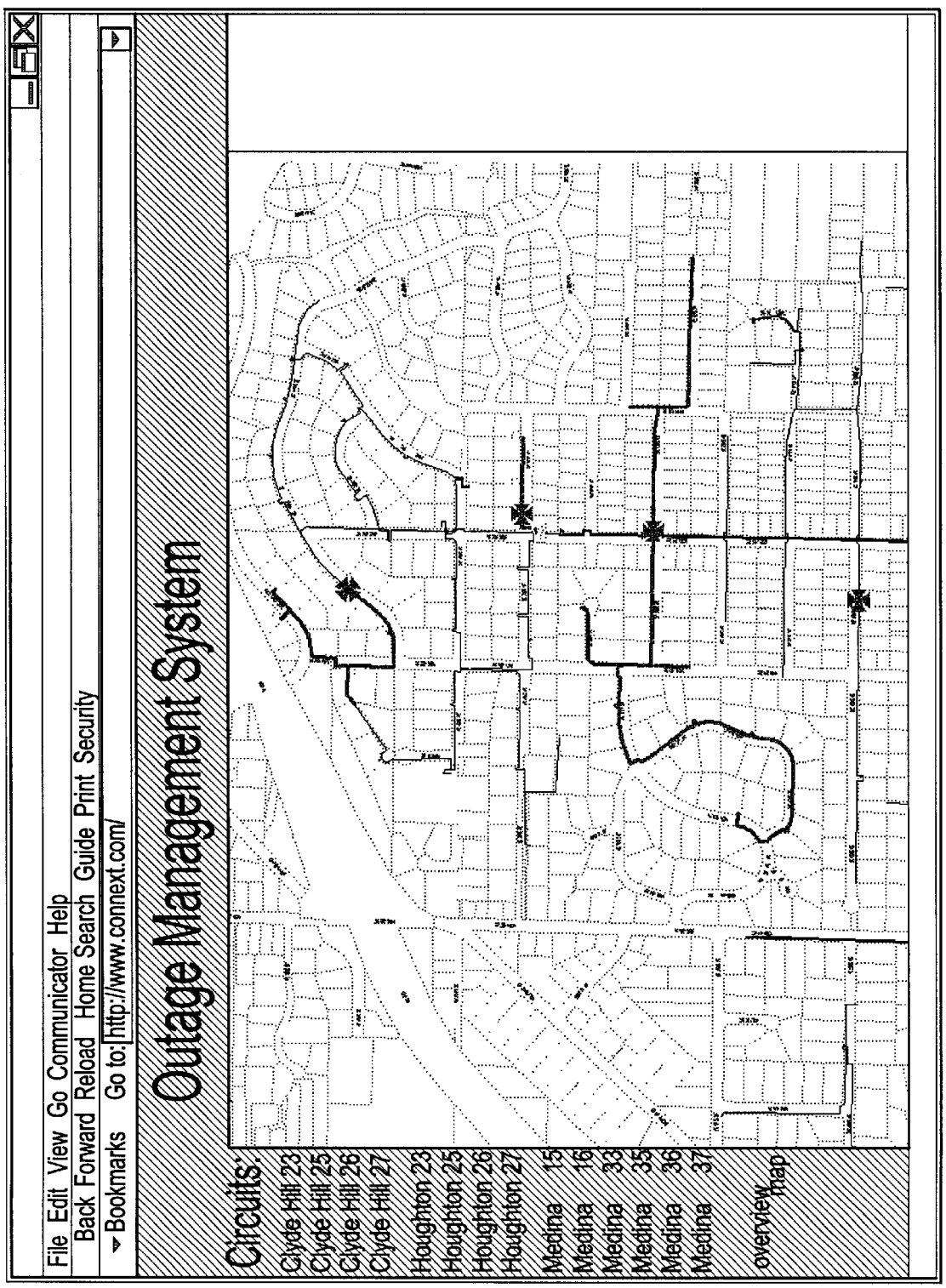

FIG. 8 illustrates a graphic display 802 for presenting power outage information to a company user at a company class computer. In one actual embodiment of the invention, a web browser application receives a web page containing data representing the power outage information via a local area network 612 (FIG. 6). The web browser application presents the graphic display 802 to the company user. Preferably, a company user is not provided with the ability to update information in the OMS.

Figure 9:
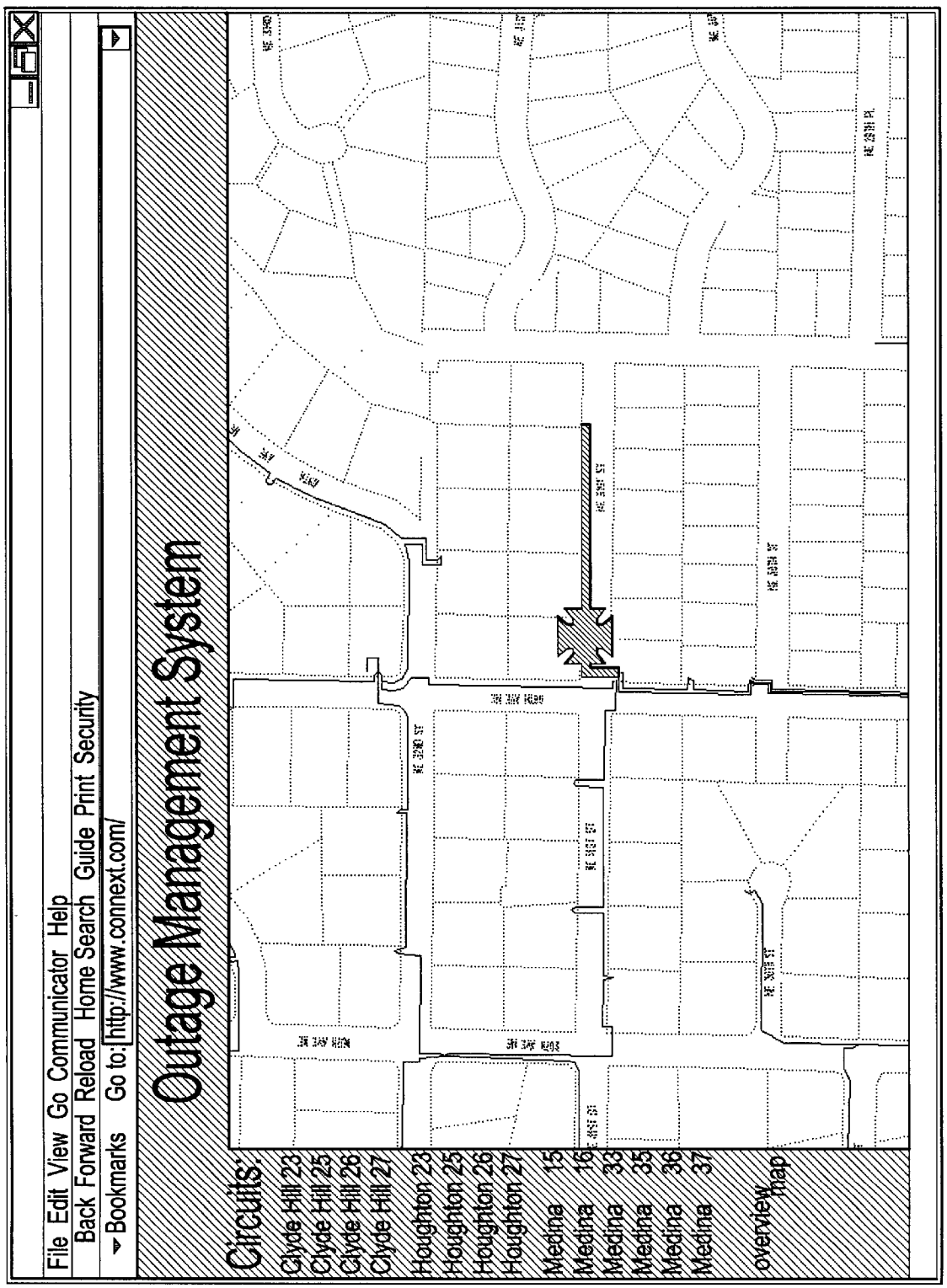

FIG. 9 illustrates a graphic display 902 for presenting power outage information to an external subscriber at an external class computer 620 (FIG. 6). In one actual embodiment of the invention, a web browser application receives a web page containing data representing the power outage information via a wide area network, such as the Internet 612. An external subscriber is not provided with the ability to update information in the OMS.

Figure 10:
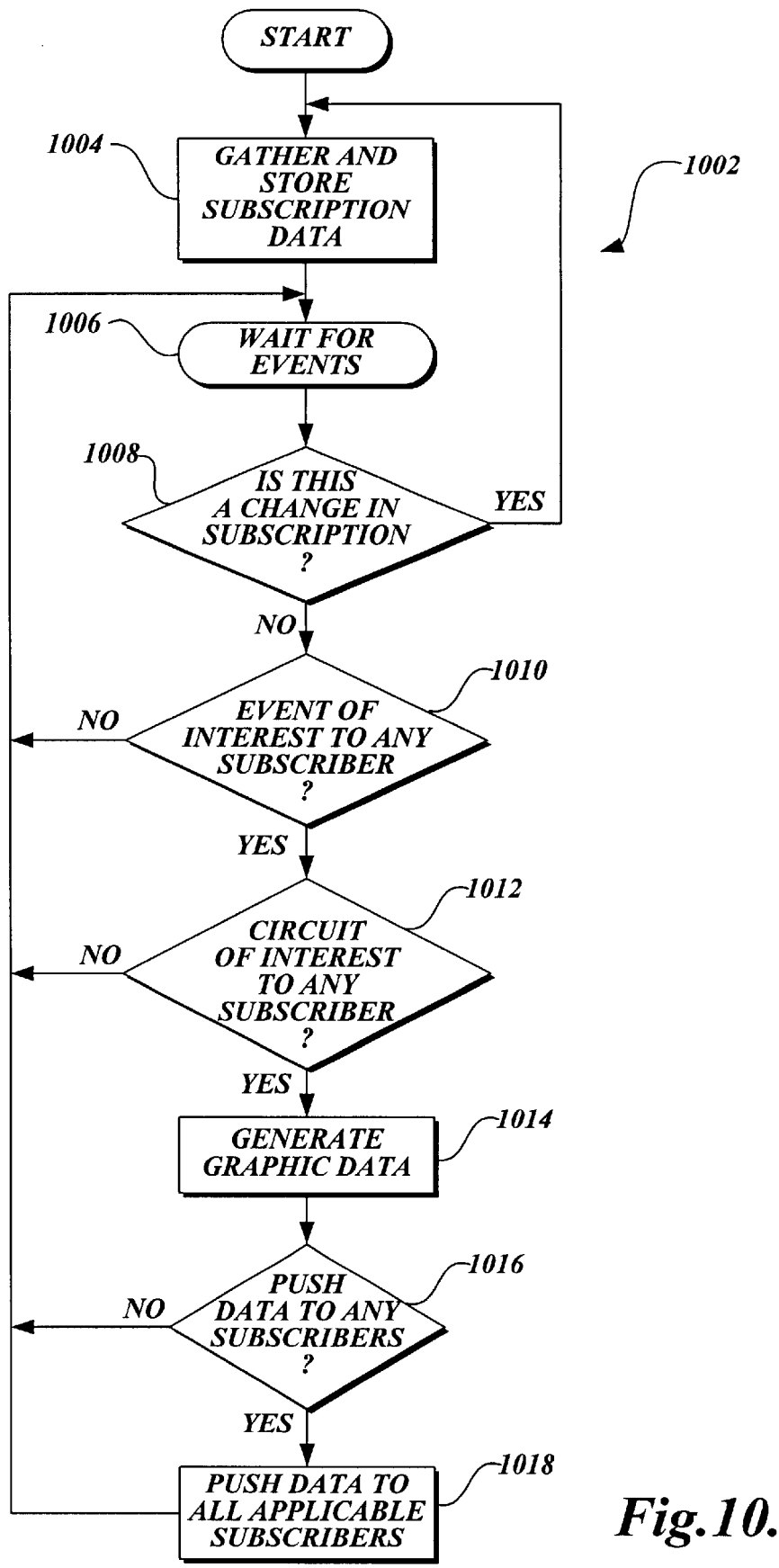
FIG. 10 is a flow diagram illustrating a process of disseminating power outage information.

FIG. 10 illustrates a process 1002 of disseminating power outage information to users, also referred to as subscribers. At a step 1004, the mechanism of the invention gathers subscription data and stores it in a subscription database. As discussed above, subscription data includes information specifying the events and the areas of interest corresponding to each subscriber, and indicates the information that each subscriber is interested in. At a step 1006, the process 1002 waits for new events to be received. After receiving a new event, the process 1002 proceeds to a step 1008, where a determination is made of whether the event pertains to a change in subscription data. If the event pertains to a change in subscription data, flow control proceeds back to the step 1004 to gather and store the new subscription data, as discussed above.

If, at the step 1008, it is determined that the new event is not a subscription change, at a step 1010, a determination is made of whether the new event is of interest to any subscriber, according to the stored subscription data. Some events are for internal operation of the system, and are not intended to be subscribed to by a subscriber. When these events are received, flow control proceeds back to the step 1006 to wait for the next event. If, at the step 1010, it is determined that the new event is of interest to at least one subscriber, at a step 1012 a determination is made of whether the circuit corresponding to the event is of interest to any subscriber. If, no subscriber is interested in the circuit corresponding to the event, flow control proceeds back to the step 1006 to wait for the next event.

If, at the step 1012, it is determined that the circuit corresponding to the event is within the area of interest of at least one subscriber, at the step 1014, graphic data is generated to reflect the new event. The graphic data is stored in the data storage repository 606 (FIG. 6). At a step 1016, determination is made of whether any subscribers request that data pertaining to the current type of event affecting the current circuit is to be pushed to the subscriber. If, at the step 1016, it is determined that data is not to be pushed to any subscriber, flow control proceeds back to the step 1006 to wait for the next event. If it is determined that data is to be pushed to a subscriber, at a step 1018, the mechanism of the invention pushes data to all applicable subscribers. The process of pushing data to subscribers is discussed in further detail below. After pushing data to all applicable subscribers, flow control proceeds back to a step 1006 to wait for the next event.

Figure 11:
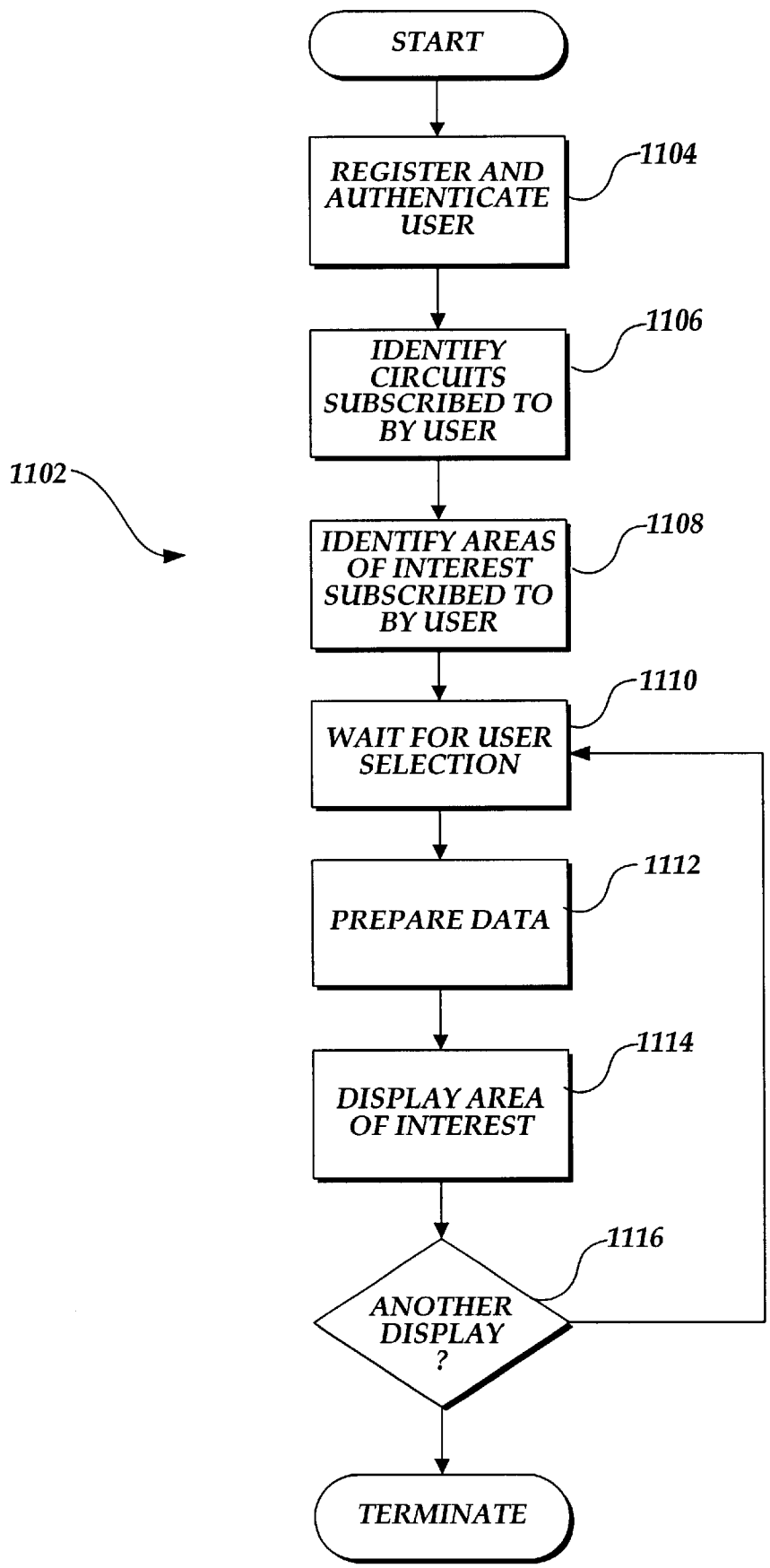
FIG. 11 is a flow diagram illustrating a process of providing power outage information to a subscriber using the pull method of information dissemination.

FIG. 11 illustrates a process 1102 of providing information to a subscriber using the "pull" method of information dissemination. At a step 1104, the mechanism of the invention registers and authenticates a subscriber. At a step 1106, the circuits that are subscribed to by the subscriber are identified. At a step 1108, the areas of interest subscribed to by the subscriber are identified. At a step 1110, the process 1102 waits for the subscriber to submit a request for new data.

At a step 1112, the mechanism of the invention prepares the applicable data corresponding to the subscriber. At a step 1114, the mechanism of the invention displays the area of interest subscribed to by the subscriber. At a step 1116, a determination is made of whether there is an additional request by the subscriber. If there is not an additional request, the process 1102 terminates. If, at the step 1116, there is an additional request, the process 1102 loops back to the step 1110 to receive the next subscriber request.

Figure 12:
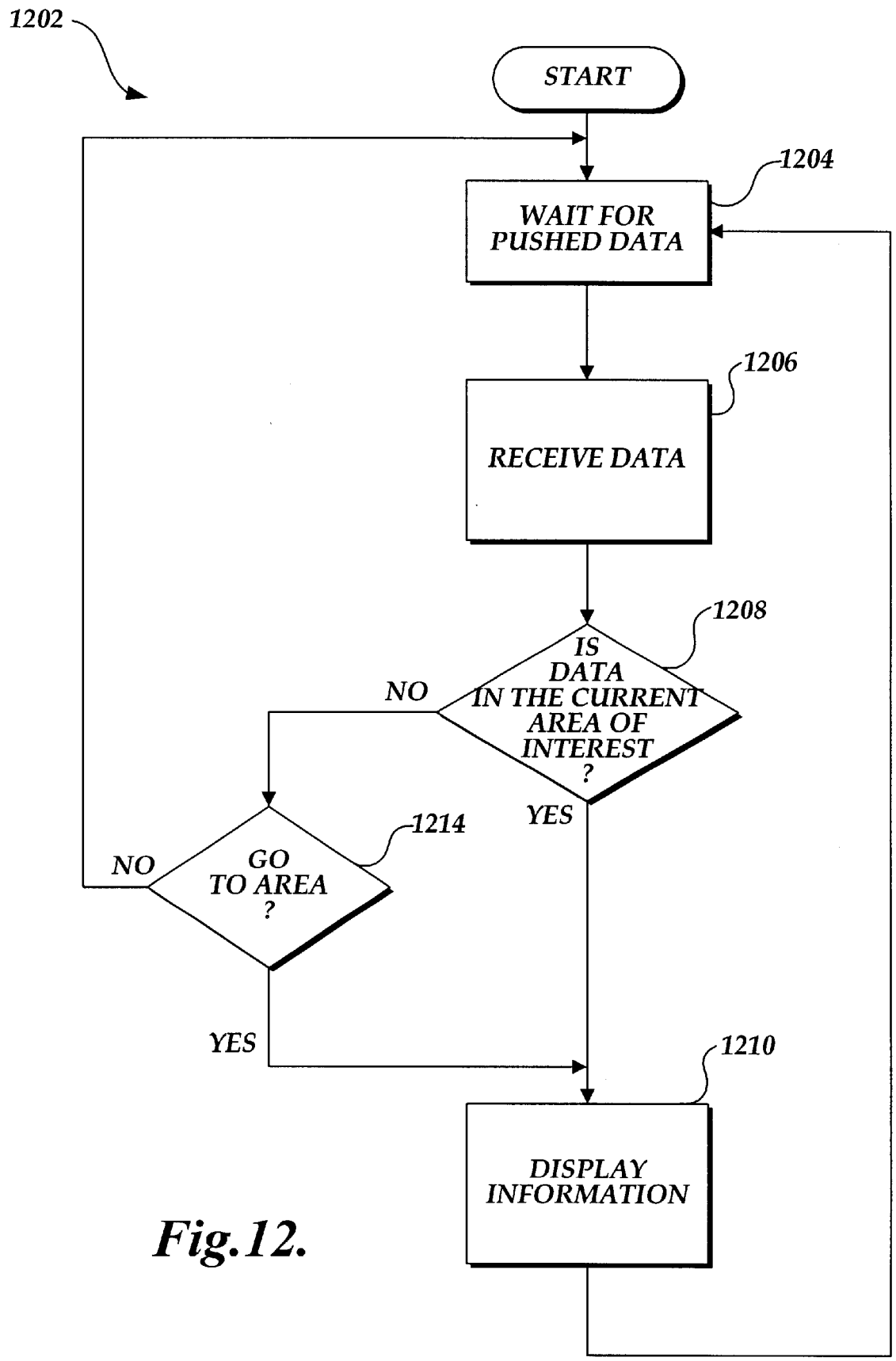
FIG. 12 is a flow diagram illustrating a process of receiving power outage information by a subscriber using the push method of information dissemination.

FIG. 12 illustrates a process 1202 of receiving "pushed" data as performed on a subscriber computer. At a step 1204, the subscriber waits for new pushed data to arrive. At a step 1206, the subscriber receives the new data. At a step 1208, the subscriber process determines whether the newly received data is in the current area of interest. The current area of interest is the area of interest currently being viewed by the subscriber. If the data is in the current area of interest, at a step 1210, the subscriber computer displays the information, preferably on the computer monitor. After displaying the information at the step 1210, the process 1202 loops back to the step 1204 to wait for new pushed data to arrive.

If, at the step 1208, the newly received data is not in the current area of interest, at a step 1204, a determination is made of whether the subscriber program should modify the current area of interest to correspond to the newly received data. For example, the subscriber program may query the subscriber for a command on whether to modify the current area of interest. Alternatively, the subscriber program may be preconfigured to automatically change the current area of interest when certain conditions are satisfied. If, at the step 1214, it is determined that the program should modify the current area of interest, at a step 1210, the newly received data is displayed, as discussed above. If, at the step 1214, it is determined that the current area of interest is not to be modified, flow control proceeds back to the step 1204, to wait for new pushed data.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of disseminating utility outage information to at least two groups of subscribers, including a first group of subscribers and a second group of subscribers, the method comprising:

maintaining a database of information corresponding to power utility distribution;

obtaining an event representing utility outage information;

determining whether the utility outage information corresponds to at least one subscriber;

generating graphic data corresponding to the utility outage information and the power utility distribution information;

selectively transmitting a first subset of the graphic data to at least one subscriber in the first group of subscribers; and selectively transmitting a second subset of the graphic data to at least one subscriber in the second group of subscribers;

wherein the first subset of the graphic data is different from the second subset of the graphic data.

2. The method of claim 1, further comprising selectively transmitting a third subset of the graphic data to at least one subscriber in a third group of subscribers, wherein the third subset of graphic data is different from at least the first subset of the graphic data.

3. The method of claim 2, wherein the second subset of the graphic data is transmitted to the subscriber in the second group of subscribers over a local area network.

4. The method of claim 2, wherein:

the second subset of the graphic data is transmitted to at least one subscriber in the second group of subscribers over a local area network; and the third subset of the graphic data is transmitted to at least one subscriber in the third group of subscribers over a wide area network.

5. The method of claim 1, wherein the first subset of the graphic data is transmitted to the subscriber in the first group over a client-server communication medium.

6. The method of claim 1, wherein the first subset of the graphic data is transmitted to the subscriber in the first group over a wide area network.

7. The method of claim 1, wherein the first subset of the graphic data is transmitted to the subscriber in the first group over the Internet.

8. The method of claim 1, wherein the first subset of the graphic data is automatically transmitted to at least one subscriber in response to receiving the event representing the utility outage information.

9. The method of claim 8, wherein the second subset of the graphic data is stored and subsequently transmitted to at least a second subscriber in response to receiving a data request from the second subscriber.

10. The method of claim 1, wherein the second subset of the graphic data is stored and subsequently transmitted to at least a second subscriber in response to receiving a data request from the second subscriber.

11. The method of claim 1 further comprising obtaining outage information from at least one subscriber in the first group of subscribers.

12. A computer-readable medium having computer-readable instructions operable to perform the steps recited in claim 1.

13. A computer system having a processor, a memory and an operating environment for performing the steps recited in claim 1.

14. The method as recited in claim 1, wherein the second subset of the graphic data is read only.

15. A method of disseminating utility outage information to at least two groups of subscribers, including a first group of subscribers and a second group of subscribers, the method comprising:

maintaining a database of information corresponding to power utility distribution;

obtaining an event representing utility outage information;

determining whether the utility outage information corresponds to at least one subscriber;

generating graphic data corresponding to the utility outage information and the power utility distribution information;

selectively transmitting a first subset of the graphic data to at least one subscriber in the first group of subscribers; and selectively transmitting a second subset of the graphic data to at least one subscriber in the second group of subscribers;

wherein the first subset of the graphic data includes graphic data not included in the second subset of the graphic data.

16. The method of claim 15, further comprising selectively transmitting a third subset of the graphic data to at least one subscriber in a third group of subscribers, wherein the second subset of the graphic data includes graphic data not included in the third subset of the graphic data.

17. The method as recited in claim 16, wherein:

the second subset of the graphic data is transmitted to at least one subscriber in the second group of subscribers over a local area network; and the third subset of the graphic data is transmitted to at least one subscriber in the third group of subscribers over a wide area network.

18. The method as recited in claim 15, wherein the second subset of the graphic data is transmitted to the subscriber in the second group of subscribers over a local area network.

19. The method as recited in claim 15, wherein the first subset of the graphic data is transmitted to the subscriber in the first group over a client-server communication medium.

20. The method as recited in claim 15, wherein the first subset of the graphic data is transmitted to the subscriber in the first group over a wide area network.

21. The method as recited in claim 15, wherein the first subset of the graphic data is transmitted to the subscriber in the first group over the Internet.

22. The method as recited in claim 15, wherein the first subset of the graphic data is automatically transmitted to at least one subscriber in response to receiving the event representing the utility outage information.

23. The method of claim 22, wherein the second subset of the graphic data is stored and subsequently transmitted to at least a second subscriber in response to receiving a data request from the second subscriber.

24. The method of claim 15, wherein the second subset of the graphic data is stored and subsequently transmitted to at least a second subscriber in response to receiving a data request from the second subscriber.

* * * * *